UNITED STATES PATENT OFFICE.

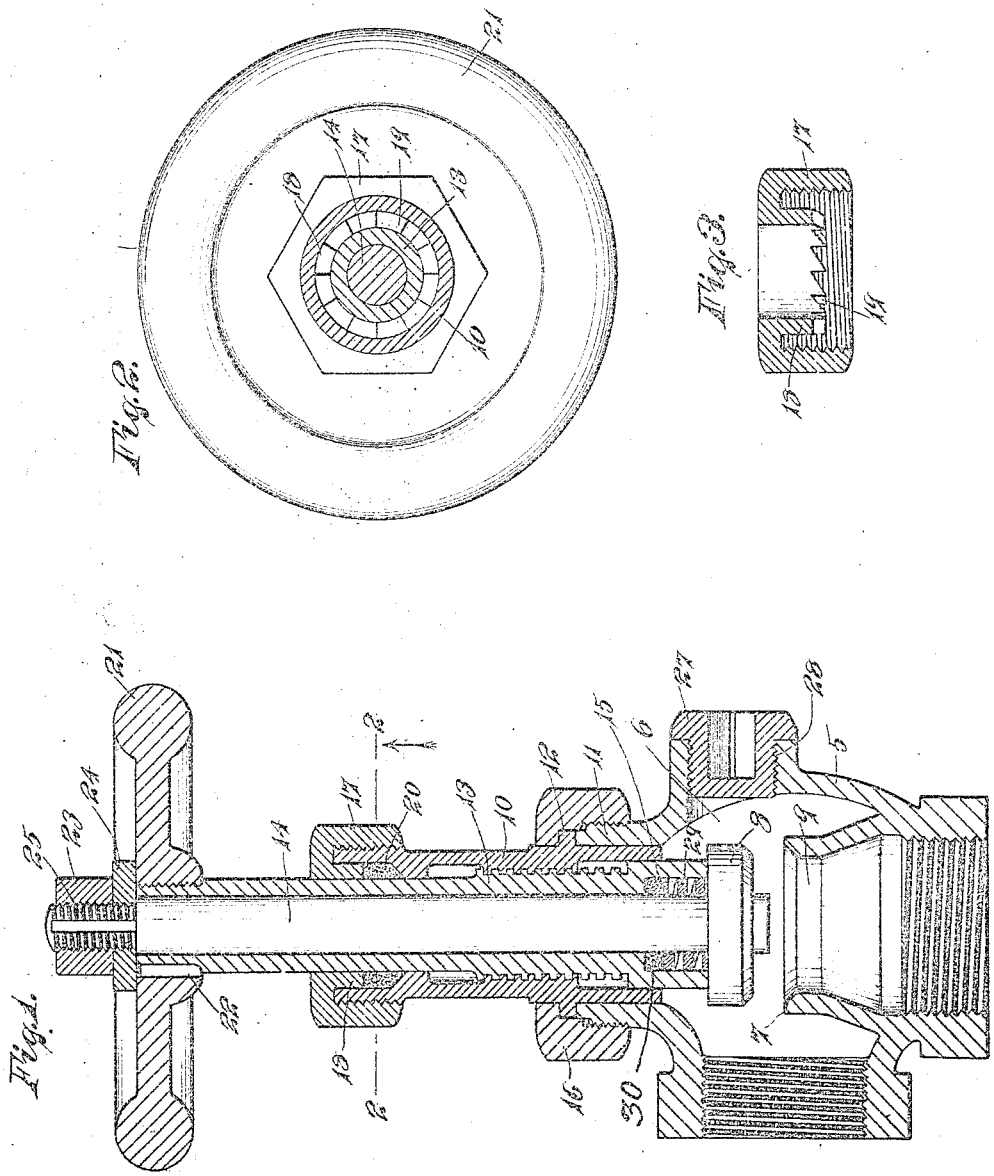

GEORGE B. McCRACKEN, OF WILLIMANTIC, CONNECTICUT.

VALVE.

1,285,280.   Specification of Letters Patent.   Patented Nov. 19, 1918.

Application filed October 8, 1917.   Serial No. 195,344.

*To all whom it may concern:*

Be it known that I, GEORGE B. MCCRACKEN, a citizen of the United States, residing at Willimantic, in the county of Windham and State of Connecticut, have invented a new and Improved Valve, of which the following is a specification.

My invention relates more especially to that class of valves in which the valve plunger is mounted at the end of a rotatable spindle and is, by means of screw threads, caused to be moved toward and away from its seat, and an object of my invention, among others, is to provide a valve having means for maintaining its efficiency for long periods of time and one that shall be particularly free from liability to leak.

One form of device embodying my invention and in the construction and use of which the objects herein set out, as well as others, may be attained, is illustrated in the accompanying drawings, in which:

Figure 1 is a view in central longitudinal section through a valve embodying my invention.

Fig. 2 is a view in cross section through the same on plane denoted by dotted line 2—2 of Fig. 1.

Fig. 3 is a detail view in central longitudinal section through the gland-nut.

In the accompanying drawings the numeral 5 denotes the valve body having the usual valve chamber 6 with an inlet opening thereto and an outlet opening therefrom, and 7 denotes the valve seat against which the valve head 8 is adapted to be pressed to prevent flow of fluid through the opening 9.

In the use of valves of this class the meeting faces of the valve head and valve seat soon become worn and then it becomes necessary to "true" them up in order to make them tight. A common practice in truing up these faces is to rotate the valve head against the seat, and while the methods heretofore practised and the means heretofore employed have involved great trouble and labor I have provided means in my improved valve whereby this grinding operation may be readily performed and with little trouble.

To this end I provide an interiorly threaded feeding sleeve 10 projecting within the neck 11 of the valve body, said sleeve having a flange 12 seated upon the end of said neck. A valve spindle sleeve 13 is provided with an exterior thread to fit that upon the sleeve 10, and a valve stem or spindle 14 extends through the sleeve 13 and supports the valve head 8 at its lower end. The sleeve 13 abuts with its end against the valve head 8, and a packing chamber 15 is formed in the sleeve 13 immediately back of said head 8 to prevent flow of fluid past the head and between the stem 14 and the interior wall of the sleeve 13. A cap 16 is formed to engage the flange 12 and the screw threaded neck 11 to secure the sleeve 10 in place. A gland nut 17 is secured to the outer screw threaded end of the sleeve 10 and this nut has a gland 18 integral with it and closely encircling the sleeve 13. The edge of this gland is provided with teeth 19 of ratchet form so that when the nut 17 is turned in one direction to secure the parts in place and press the gland upon the packing 20, the teeth will ride over the packing, but when the nut is turned in the opposite direction to release the parts the teeth will catch into the packing and thus will roughen and loosen it and eventually raise it from its place so that the removal of the nut will automatically remove the packing and thus avoid much trouble that has heretofore existed in efforts to remove the packing after a nut and separate gland have been displaced.

A hand wheel 21 is secured to the screw threaded end of the sleeve 13 and the two are caused to rotate together as by means of a key 22. A nut 23 is secured to the screw threaded end of the spindle or stem 14, a washer 24 being located between the nut and a shoulder at the base of the threaded end 25 of the stem. The thickness of the hub of the wheel 21 is such that when the nut 23 is tightly set there will be little friction between the washer 24 and the hub of the wheel, this frictional contact being sufficient to cause the spindle 14 and sleeve 13 to turn together as the wheel 21 is turned, but insufficient to prevent separate turning movement of the spindle 14 upon the application of sufficient power to the nut 23. A plug 27 fits an opening 28 through the body of the valve opposite the valve seat, this opening being provided for the purpose of introducing an abrasive material to the valve seat when it is desired to grind such seat.

In the operation of the device the plug 27 being removed and abrasive material being applied to the valve seat, the wheel 21 is moved until the valve head 8 is brought against the valve seat. A handle, as a bit-brace, may now be applied to the nut 23 and such handle being rotated the spindle 14 and valve head 8 will also be rotated, and by imparting a slight movement to the wheel 21 from time to time the threads between the sleeves 10 and 13 will cause the valve head to press tightly against the valve seat and thus effect grinding operation.

It is of the utmost importance that the leaking of fluid past the valve head and between the valve spindle sleeve and valve spindle, and consequent "drip" at the end of the valve spindle shall be prevented, as this has heretofore been very annoying and has not been remedied. I have paid special attention to this feature and my invention embodies means to effectually cure the objections from such causes. To this end I insert a packing 30 within the chamber 15 and closely surrounding the valve spindle. A spring 29 thrusting against the valve head and against said packing holds the latter tightly in place and thus effectually packs the joint at this point and prevents flow of liquid along the spindle. In the grinding operation hereinbefore described the back of the valve head in contact with the lower end of the valve spindle sleeve causes these meeting surfaces to be ground true, and abrasive material may be applied if desired to these parts through the opening in the valve body. Likewise the operation will cause a grinding action between the washer 24 and the end of the valve spindle sleeve and the hub of the hand wheel so that in addition to the packing within the chamber 15 my improved valve is provided with means whereby a metallic seal is provided at the lower end of the valve spindle sleeve as well as at the upper end thereof.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim:—

1. A valve body having a valve chamber with a valve seat therein, a feeding sleeve secured to the valve body, a valve spindle sleeve fitting the screw threaded interior wall of said feeding sleeve, said spindle sleeve having a packing chamber at the inner end thereof, a valve spindle located in said spindle sleeve, a valve head secured to the end of the spindle and adapted to rest against the end of said spindle sleeve to close said packing chamber, and a packing located within said chamber.

2. A valve body having a chamber with a valve seat therein, a sleeve projecting from said body and secured thereto, said sleeve having a packing chamber in its outer end, a valve spindle projecting through said sleeve, a valve head secured to the inner end of the spindle, a packing located in said chamber, a packing nut detachably secured to said sleeve, and a gland rigidly secured to said nut and having a toothed edge to engage the packing in said chamber, whereby said packing is loosened by an unscrewing of the nut.

3. A valve body having a chamber with a valve seat therein, an interiorly threaded feeding sleeve projecting from and secured to said body, said sleeve having a packing chamber in its outer end, a valve spindle sleeve having a threaded surface to fit the threaded inner wall of said feeding sleeve and a packing chamber at its inner end, a valve spindle projecting through the valve spindle sleeve, a valve head secured to the inner end of the spindle to close the packing chamber in the valve spindle sleeve, a packing located in said last mentioned chamber, a packing located in the chamber in the feeding sleeve, and means for closing the end of the feeding sleeve to press the packing therein and to loosen said packing by the removal of said means.

GEORGE B. McCRACKEN.